United States Patent
Schmidt et al.

(10) Patent No.: US 6,916,420 B2
(45) Date of Patent: Jul. 12, 2005

(54) WIDE PASSAGE CROSS-FLOW FILTER CASSETTES

(75) Inventors: Hans-Weddo Schmidt, Hardegsen (DE); Ulrich Grummert, Bad Sooden-Allendorf (DE); Ina Pahl, Hannover (DE); Claudia Hartmann, Adelebsen (DE)

(73) Assignee: Sartorius AG, Goettingen (DE)

( * ) Notice: Subject to any disclaimer, the term of this patent is extended or adjusted under 35 U.S.C. 154(b) by 274 days.

(21) Appl. No.: 10/258,963

(22) PCT Filed: Apr. 19, 2001

(86) PCT No.: PCT/EP01/04435

§ 371 (c)(1),
(2), (4) Date: Oct. 28, 2002

(87) PCT Pub. No.: WO01/85316

PCT Pub. Date: Nov. 15, 2001

(65) Prior Publication Data

US 2003/0173285 A1 Sep. 18, 2003

(30) Foreign Application Priority Data

May 8, 2000 (DE) .......................................... 100 22 259

(51) Int. Cl.[7] .............................................. B01D 63/00
(52) U.S. Cl. ............................ 210/321.75; 210/321.84; 210/231
(58) Field of Search ....................... 210/321.75, 321.84, 210/231, 650, 456, 321.74; 96/4

(56) References Cited

U.S. PATENT DOCUMENTS

| | | | | | |
|---|---|---|---|---|---|
| 3,627,137 A | * | 12/1971 | Bier | ....................... | 210/321.75 |
| 3,660,280 A | * | 5/1972 | Rogers | ....................... | 210/646 |
| 3,796,313 A | * | 3/1974 | Bigt et al. | ............. | 210/321.75 |
| 3,993,517 A | * | 11/1976 | Schneider | ..................... | 216/54 |
| 4,087,577 A | * | 5/1978 | Hendrickson | ............... | 428/110 |
| 4,301,013 A | * | 11/1981 | Setti et al. | ................... | 210/637 |
| 4,715,955 A | | 12/1987 | Friedman | | |
| 4,735,718 A | * | 4/1988 | Peters | .................... | 210/321.75 |
| 4,902,417 A | * | 2/1990 | Lien | ....................... | 210/321.74 |
| 4,906,372 A | * | 3/1990 | Hopkins | ................ | 210/321.74 |
| 5,575,910 A | * | 11/1996 | Karbachsch et al. | ... | 210/321.75 |
| 5,593,580 A | * | 1/1997 | Kopf | ..................... | 210/321.75 |
| 5,868,930 A | * | 2/1999 | Kopf | ..................... | 210/321.75 |
| 5,922,200 A | * | 7/1999 | Pearl et al. | ............ | 210/321.75 |

FOREIGN PATENT DOCUMENTS

DE 3441249 * 12/1984

* cited by examiner

*Primary Examiner*—Ana Fortuna
(74) *Attorney, Agent, or Firm*—Chernoff, Vilhauer, McClung & Stenzel, LLP

(57) ABSTRACT

An improved wide passage cross-flow filtration cassette is disclosed that incorporates an open mesh matrix retentate spacer that is dimensioned and oriented so as to improve flux and cause turbulence in the flow of fluids through the cassette.

13 Claims, 2 Drawing Sheets

WIDE PASSAGE CROSS-FLOW FILTER CASSETTES

This is a §371 of PCT/EP01/04435 filed Apr. 19, 2001 and claiming priority of DE 100 22 259.5 filed May 8, 2000.

BACKGROUND OF THE INVENTION

Particle-laden fluids, particularly those containing proteins, fats, cells and cell fragments of the sort encountered in pharmaceutical and biotechnical applications, are filtered according to the cross-flow principle on both laboratory and industrial scales. The goal of the filtration may include the recovery of valuable material, the concentration of substances, the separation of undesirable components and sterilization.

Although cross-flow filtration may be carried out with a single filter cassette, it is generally conducted with multiple filter cassettes in a stacked configuration. Such cross-flow filter cassettes are disclosed in DE 3 441 249 and U.S. Pat. No. 4,715,955. Such filter cassettes are constructed of multiple filter cells comprising stacked flat sections of at least one retentate spacer forming a feed flow passage or slit, a first microporous membrane, a permeate spacer forming a permeate collection passage or slit and a second microporous membrane. Such stacked flat sections are bound to the filter cassette by sealant. The flat sections are provided with aligned openings in their peripheral area that form flow conduits running perpendicular to the surfaces of the flat sections and that are useable as a fluid feed inlet and as outlets for retentate and permeate. Each opening of the spacers which is desired to be closed to the flow conduits is surrounded by fluid-tight sealant in its periphery which extends slightly beyond the opening. The remaining openings in the spacers which are to be in fluid communication with the conduits have no sealant, but are left open.

In cross-flow filtration the fluid feed is pumped through a leading plate and corresponding conduits are in fluid communication with at least one feed flow passage or slit of the filter cassette, causing the feed to flow over the microporous membrane's surface and to be removed as retentate. A portion of the feed permeates through the membrane and is collected in a permeate collection passage or slit and, by means of appropriate conduits and an outlet, is removed from the cassette as filtrate or permeate.

To protect the membrane from mechanical damage which can occur in the transition areas of the sealant and usually caused by excessive pressure on the membrane, DE 34 41 249 suggests the insertion of protective frames between the sections of the filter cassette. In addition to achieving protection of the membranes, the feed flow passage or slit is widened, allowing thicker fabrics to be employed to increase the height of the flow passage. Cassettes provided with such wide passages tend not to be subject to early blockages. However, a disadvantage of such wide passage cassettes is that particles and proteins in the filtered fluids are captured in the matrices of the fabric in the feed flow passage and tend to agglomerate there. This agglomerated material causes a flow restriction of the fluid feed. Known cross-flow filter cassettes having wide passages are therefore not suitable for cross-flow filtration of particle-laden, protein-carrying fluids, because a massive reduction of the retentate often occurs and after a short filtration period filtration is terminated altogether by the buildup of particles, proteins and the like in the feed flow passages.

Thus, the goal of the invention is to provide cross-flow filter cassettes which are appropriate for cross-flow filtration of fluids containing particles such as proteins, fats, cells and cell fragments such as are encountered in pharmaceutical and biotechnological applications, and which are characterized by a long filtration life and a high throughput of retentate and filtrate flows.

BRIEF SUMMARY OF THE INVENTION

The cross-flow filter cassette of the invention comprises an improvement on conventional wide passage cross-flow filtration cassettes. The principal improvement is that the cassettes are provided with at least one retentate spacer of an open mesh matrix that is constructed, dimensioned and oriented so as to permit greatly improved throughput of the fluid feed, that allows passage of larger particles, that creates turbulence in the fluid flow, and that permits the filtration membrane to flex, with all of these features leading to more efficient filtration and to a filter cassette having a longer filtration life. In addition the inventive cassette is provided with thicker retentate spacer frames that further enhance fluid flow across the adjacent filtration membrane, thereby permitting relatively large particles to be flushed both by the fluid flow therethrough and by backwashing. The design further permits the entire surface of the membrane to remain available for filtration because the retentate spacer does not obstruct the membrane surface.

DETAILED DESCRIPTION OF PREFERRED EMBODIMENTS

Figure 1:
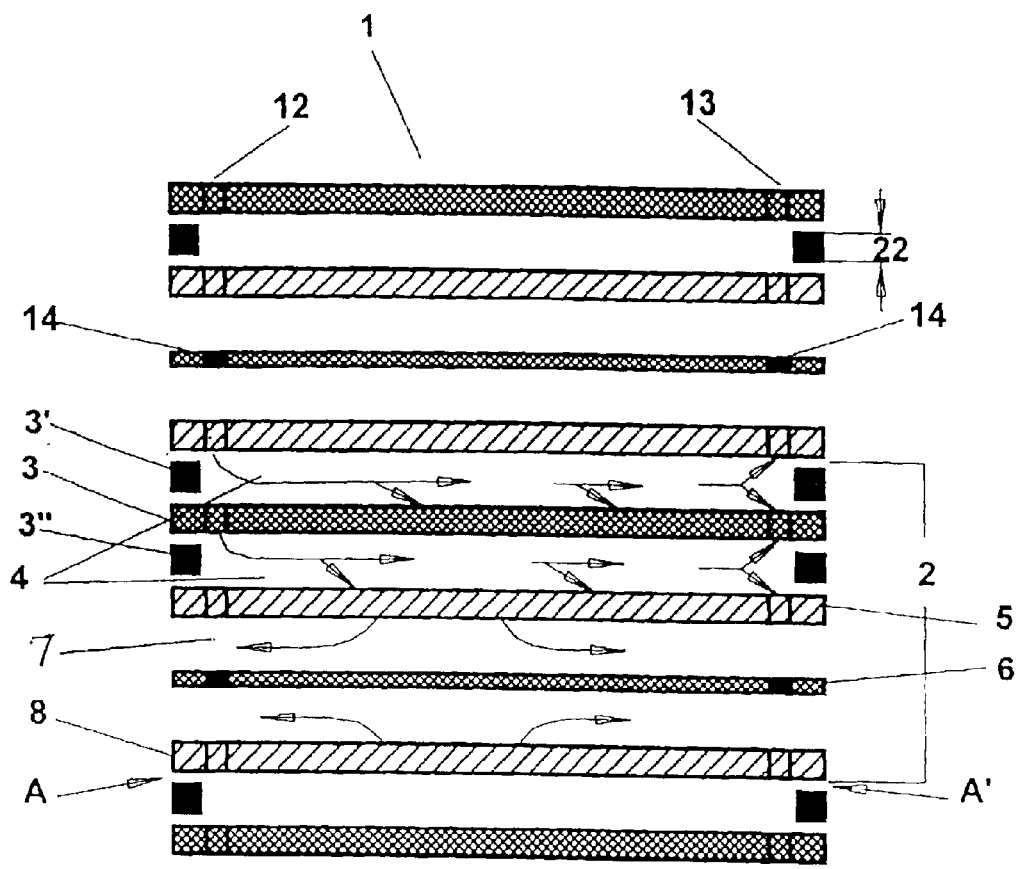
FIG. 1 is an exploded cross-sectional schematic of an exemplary cross-flow filter cassette of the invention.

The retentate spacer of the invention comprises an open mesh matrix constructed from mutually intersecting longitudinal and transverse threads that are spaced at a distance of from about 5 to 15 times their diameter or thickness. The thread diameter preferably lies in the range of from about 150 to about 600 $\mu$m, which tends to create an optimal turbulent flow of the fluid feed through the retentate spacer and in the feed flow passage. This is in contrast to the fabrics used for retentate spacers in prior art wide passage cross-flow filter cassettes, which have a thread thickness of about 300 $\mu$m with a much tighter spacing, generally on the order of the thickness of one thread; this much tighter spacing frequently leads to blinding of the filter cassette after a short period of operation.

It is also preferred that the threads are bound or fused to each other at their points of intersection. This allows the open mesh matrix of the retentate spacer to maintain its shape and prevents the formation of "dead" zones between the threads, which would otherwise collect particles and reduce the efficiency of the filtration.

In a preferred embodiment of the invention, the longitudinal and transverse threads of the open mesh matrix consist of polymeric fibers produced by an extrusion process whereby the threads, while still in a molten state, are fused at their points of intersection to form an extruded grating appearance. It is particularly preferred that the threads of the matrix are stretched during the extrusion, which forms a matrix wherein the threads have larger diameters at their points of intersection than in the areas between their intersections. Preferably the diameters of the threads in the areas between the intersections is at least 5% smaller than the thread diameters at the intersections. This arrangement also represses blockage of the flow passages in the cassette.

An open matrix with threads of the above-mentioned dimensions, construction and orientation has the added advantage of a reduced resistance to flow of the fluid feed. Preferably, the orientation of the fibers in the open mesh matrix is symmetric, with the threads at an angle of about 90° relative to each other. Optimal filtration capacity of the cross-flow filter cassette is achieved when the longitudinal and transverse threads of the matrix are oriented at an angle of about 45° relative to the direction of the feed flow.

In another preferred embodiment of the invention, the longitudinal threads of the open mesh matrix lie in a first plane, while the transverse threads lie in a second plane that is parallel to the first plane. This favors a more turbulent flow, which in turn tends to prevent blockage of the flow passages in the cassette.

In yet another preferred embodiment of the invention a permeate spacer frame is installed on the permeate side of the membrane. In this case, the permeate spacer consists of a permeate spacer element sandwiched between two permeate spacer frames and in contact with both sides of the permeate spacer element along its periphery. The permeate spacer frames preferably are less thick than the retentate spacer frames, on the order of less than or equal to 50 $\mu$m.

Referring to the drawings, where the same numerals refer to like elements, there is shown in FIG. 1 a cross-flow filtration cassette 1, comprising a multiplicity of adjacent flat filtration cells 2 arranged in a stack. Filtration cells 2 consist of a retentate spacer 3 sandwiched between two retentate spacer frames 3', 3", the combination of which forms a divided feed flow passage 4 for the fluid to be filtered. This combination of 3', 3 and 3" is followed by a first membrane 5 and a permeate spacer 6, elements 5 and 6 in combination with a second membrane 8 in turn forming a permeate collection passage 7. Flat sections 3, 5, 6 and 8 are provided with openings 9, 10 and 11 that, when aligned provide conduits for the fluid to be filtered, namely, feed inlet 12, retentate outlet 13 and permeate outlet 14. In this arrangement, each opening in spacers 3 and 6 which form the fluid conduits are made fluid-tight with a sealant 15, which extends slightly over the surface of spacers 3 and 6.

Retentate spacer 3 consists of an open mesh matrix 16 made of crossing longitudinal threads 17 and transverse threads 18. Threads 17 and 18 are joined together at their points of intersection 19. Adjacent longitudinal and transverse threads are at a distance 20 and 21 from each other, respectively, which corresponds to a thickness of from about 5 to about 15 times the thickness of the threads. Retentate spacer frames 3' and 3" preferably have a thickness 22 in the range of about 50 to about 200 $\mu$m, more preferably about 80 $\mu$m and are preferably made of a polymer, e.g., polyvinylidene fluoride (PVDF).

EXAMPLES

In the Examples which follow a fermentation broth in a state of decomposition having an average biomass burden of 3 kg CWW/m$^2$ (CWW=cell wet weight) was filtered by cross-flow filtration with a conventional wide passage cassette and with the inventive filtration cassettes to obtain a fermentation product from the filtrate. Where biomass burden is concerned, a distinction must be made between the biomass burden in the retentate (measured in g/L) and the surface specific biomass burden (measured in kg/m$^2$). Too high a biomass burden in the retentate can lead to blockage of the divided feed flow passage 4, while too high a surface specific biomass burden can cause a buildup tending to blind the membrane.

Each filtration cassette was equipped with hydrophilic microporous filtration membranes of cross-linked cellulose hydrate with an average pore size of 0.45 $\mu$m (Hydrosart® from Sartorius AG of Goettingen, Germany), 450 $\mu$m-thick permeate spacer elements 6 of a fabric having a thread thickness of 210 $\mu$m and a spacing between threads of 210 $\mu$m, the spacer elements being provided on both sides with 50 $\mu$m-thick permeate spacer frames. The cassettes differed with respect to the spacing of the threads of their retentate spacers 3, the thicknesses of their retentate spacer frames 3' and 3", the number of their flow passages and the orientation of the longitudinal and transverse threads 17 and 18 of the open mesh matrix 16 relative to the direction of flow of the fluid to be filtered.

Comparative Example

Figure 2:
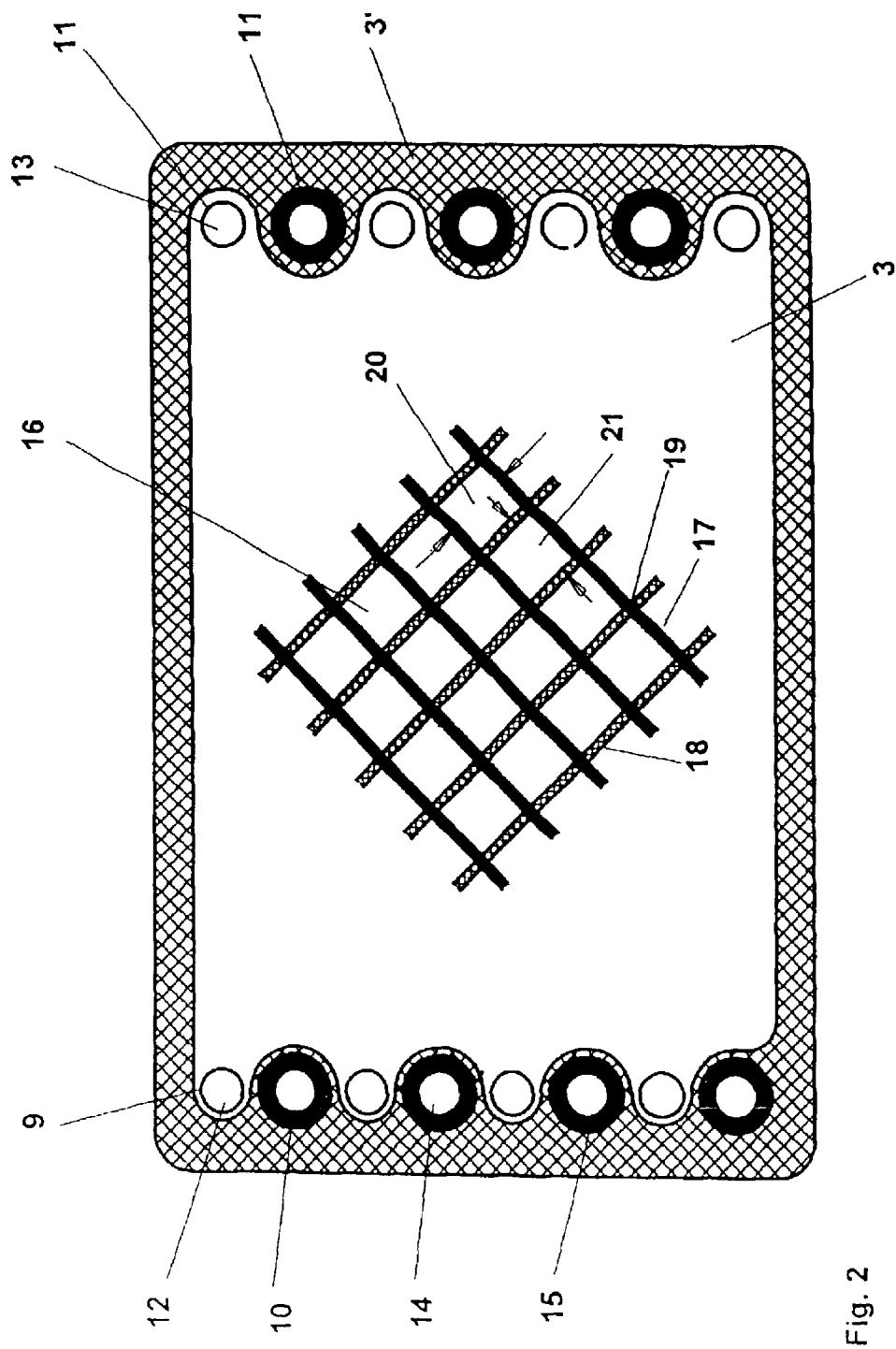
FIG. 2 is a plan view of a retentate spacer of the cassette shown in FIG. 1 taken along the plane A–A'.

Filtration was carried out with a cross-flow filter cassette of substantially the same design shown in FIGS. 1–2, but wherein the spacing of the longitudinal threads was equal to the thickness of the threads, the particulars of which are set forth below:

610 $\mu$m-thick open mesh matrices 16 in retentate spacers 3 with 300 $\mu$m-thick threads separated from each other by 300 $\mu$m;

50 $\mu$m-thick retentate spacer frames 3' and 3";

17 two-sided feed flows 4; and 16 permeate collection passages 7.

The longitudinal and transverse threads 17 and 18 of open mesh matrix 16 were oriented at an angle of 60° and 30°, respectively relative to the direction of flow of the filtered fluid. The cross-flow filtration showed a definite decline of the retentate flow in the second filtration cycle, and filtration stopped altogether in the third filtration cycle due to blockage of feed flow passage 4.

Example 1

Filtration was carried out with a cross-flow filter cassette of the inventive design, the particulars of which are set forth below:

450 $\mu$m-thick open mesh matrices 16 in retentate spacers 3 with about 210 $\mu$m-thick threads separated from each other by about 250 $\mu$m;

125 $\mu$m-thick retentate spacer frames 3' and 3";

14 feed flow passages 4; and 13 permeate collection passages 7.

The longitudinal and transverse threads 17 and 18 of open mesh matrix 16 were oriented as in the Comparative Example. The cross-flow filtration showed a diminution of the retentate fluid during the second filtration cycle. The permeate flow maintained about 70% of its initial value, while after eight filtration cycles no blocking of the feed flow passage occurred.

Example 2

Filtration was carried out with a cross-flow filter cassette of the inventive design, the particulars of which are set forth below:

1030 $\mu$m-thick open mesh matrices 16 in retentate spacers 3 with threads from about 500 to about 650 $\mu$m thick separated from each other by about 1500 $\mu$m;

80 $\mu$m-thick retentate spacer frames 3' and 3";

11 feed flow passages (4); and 10 permeate collection passages (7).

The threads of open mesh matrix 16 were fused together at their points of intersection. The longitudinal and transverse threads of the matrix were oriented at an angle of 45° relative to the direction of the feed flow. Independently of the biomass burden up to 3 kg $CWW/m^2$ the retentate and permeate flows were constant even after seven cycles and no blockage occurred.

Example 3

Filtration was carried out with a cross-flow filter cassette of the inventive design, the particulars of which are set forth below:

760 μm-thick open mesh matrices 16 in retentate spacers 3 with threads from about 350 to about 450 μm thick threads separated from each other by about 2400 μm;

80 μm-thick retentate spacer frames 3' and 3";

13 feed flow passages (4); and 12 permeate flow passages (7).

The threads were fused together at their points of intersection and had the same orientation as in Example 2. The cross-flow cassette had an effective membrane surface area of 0.1 $m^2$. Even with a biomass burden of up to 15 kg $CWW/m^2$, the retentate and filtrate flows remained constant after five cycles and no blockage occurred.

Example 4

Filtration was conducted with a cross-flow filtration cassette of the same design as in Example 3 with the exception that the effective surface area of the membrane 0.6 $m^2$.

With a biomass burden of 3 kg $CWW/m^2$, in three separate filtration tests, the results exhibited a scale factor of 6, meaning that the volume of the retentate water was six times greater than that obtained in Example 3. All other filtration capacity data (permeate flow, permeate water value, and separation capability) remained unchanged in comparison to the corresponding data obtained in Example 3.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A cross-flow filter cassette comprising multiple adjacent filtration cells (2), each of said filtration cells comprising the following stacked elements:

(a) a retentate spacer (3);

(b) two retentate spacer frames (3', 3") located on opposite sides of said retentate spacer (3);

(c) a divided feed flow passage (4);

(d) a first microporous membrane (5);

(e) a permeate spacer (6);

(f) a permeate collection passage (7); and (g) a second microporous membrane (8) separated from said first microporous membrane (5), said stacked elements having aligned openings in their peripheries that form fluid conduits that are substantially perpendicular to the surfaces of said stacked elements, and wherein said retentate spacer (3) and said two retentate spacer frames (3', 3") together form said divided feed flow passage (4) and wherein said retentate spacer (3) comprises an open mesh matrix (16) with intersecting longitudinal (17) and transverse (18) threads that are separated from each other by a distance equal to from about 5 to about 15 times their thickness.

2. The filter cassette of claim 1 wherein the thickness of said threads of said open mesh matrix is from about 150 to about 600 μm.

3. The filter cassette of claim 1 wherein said retentate spacer frames have a thickness of from about 50 μm to about 200 μm.

4. The filter cassette of claim 1 wherein said longitudinal and transverse threads are connected at their points of intersection.

5. The filter cassette of claim 4 wherein said longitudinal and transverse threads comprise polymeric fibers that are fused at their points of intersection.

6. The filter cassette of claim 5 wherein said longitudinal and transverse threads have a diameter that is at least 5% smaller between their points of intersection relative to their diameter at said points of intersection.

7. The filter cassette of any of claims 1–6 wherein said longitudinal and transverse threads are both oriented at an angle of about 45° relative to the direction of flow of the filtered fluid.

8. The filter cassette of claim 7 wherein said longitudinal and transverse threads respectively lie in separate but parallel planes.

9. The filter cassette of claim 8 wherein said permeate spacer comprises a permeate spacer element sandwiched between permeate spacer frames.

10. The filter cassette of claim 9 wherein said permeate spacer frames are in contact with, said permeate spacer element along its periphery.

11. The filter cassette of claim 10 wherein said permeate spacer frame has a thickness of up to about 50 μm.

12. The filter cassette of claim 11 wherein said first and second microporous membranes are hydrophilic membranes.

13. The filter cassette of claim 12 wherein said hydrophilic membranes are cross-linked cellulose hydrate.

* * * * *

UNITED STATES PATENT AND TRADEMARK OFFICE
CERTIFICATE OF CORRECTION

PATENT NO. : 6,916,420 B2
DATED : July 12, 2005
INVENTOR(S) : Schmidt et al.

It is certified that error appears in the above-identified patent and that said Letters Patent is hereby corrected as shown below:

Column 6,
Line 46, delete the comma "," after "with".

Signed and Sealed this

First Day of November, 2005

JON W. DUDAS
*Director of the United States Patent and Trademark Office*